Jan. 14, 1969     E. G. FREEHAUF     3,421,369
PRESSURE INDICATING PROBE
Filed Jan. 31, 1967
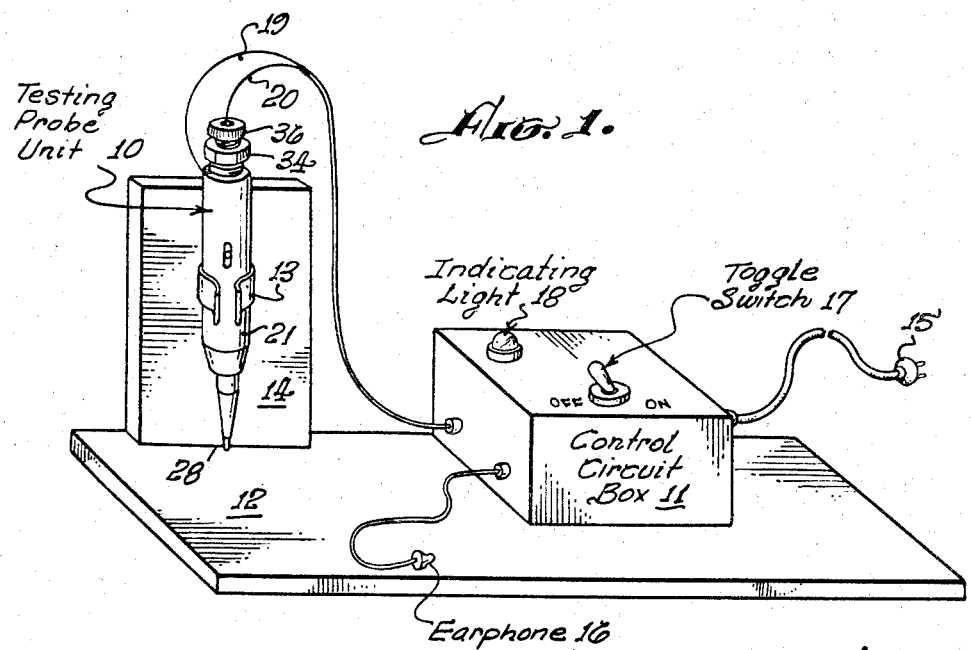
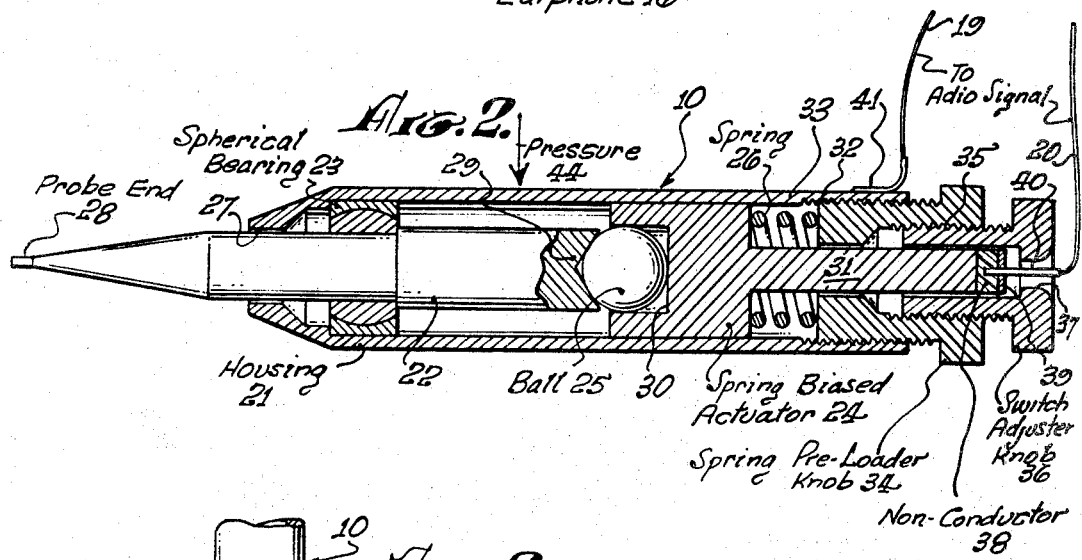
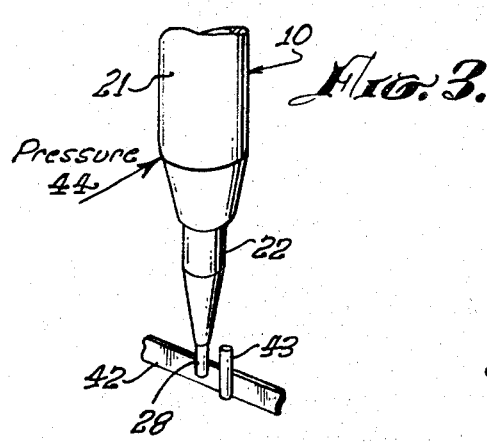
INVENTOR.
EUGENE G. FREEHAUF,
By L. E. Carnahan
AGENT

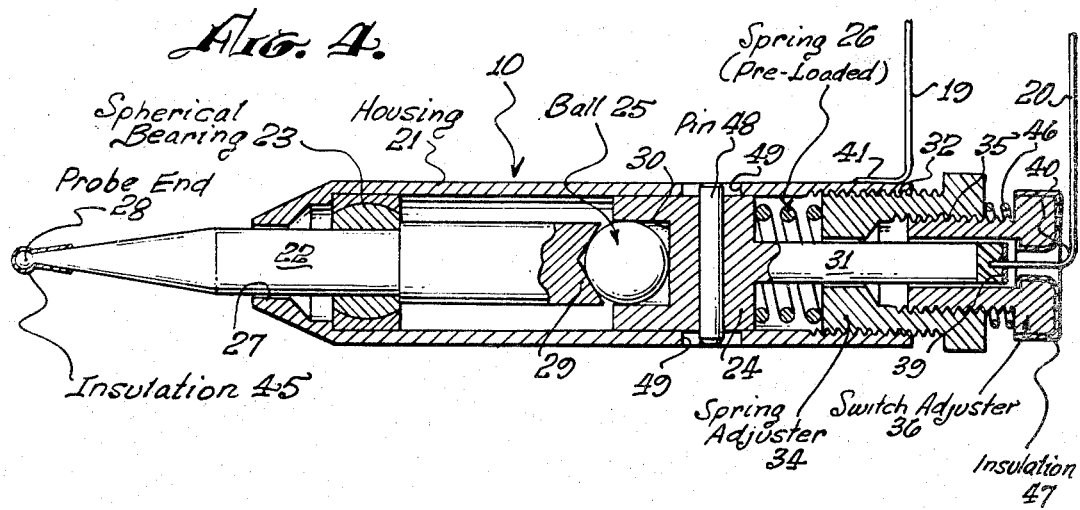
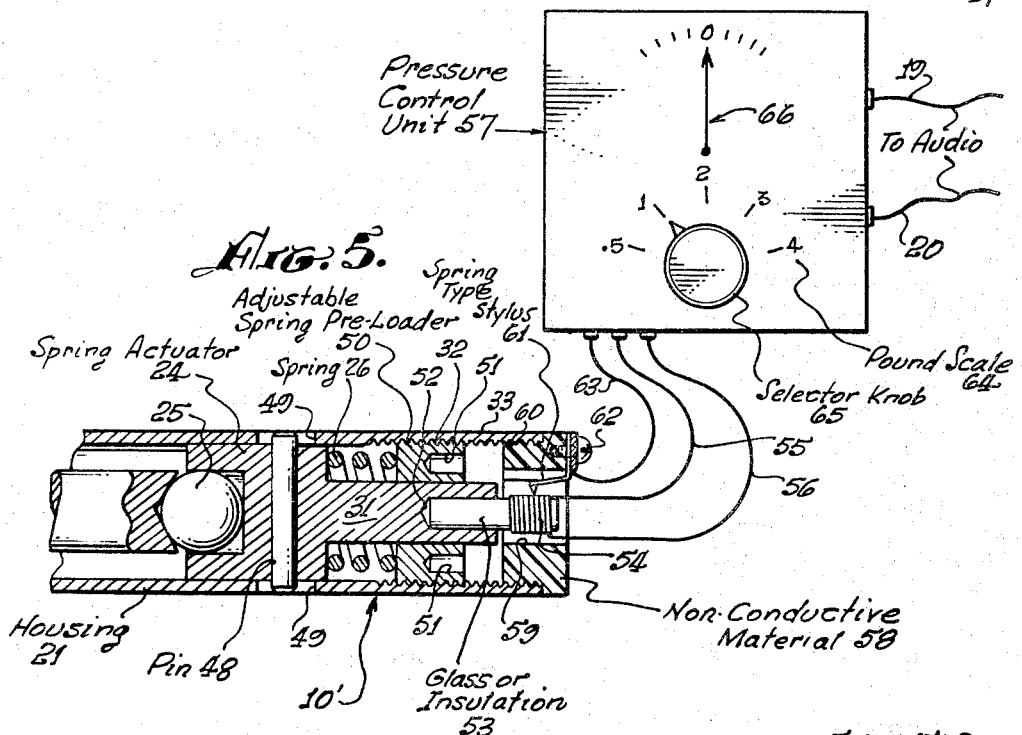

United States Patent Office 3,421,369
Patented Jan. 14, 1969

3,421,369
PRESSURE INDICATING PROBE
Eugene G. Freehauf, Ontario, Calif., assignor to General Dynamics Corporation, a corporation of Delaware
Filed Jan. 31, 1967, Ser. No. 612,913
U.S. Cl. 73—141     10 Claims
Int. Cl. G01l 5/18

ABSTRACT OF THE DISCLOSURE

The disclosure relates to a testing device which includes a probe unit arranged to apply a maximum, pre-set force to an article for use in checking, for example, suspected weak weld joints. The unit comprises an elongated rod having an article engaging probe end, and a conical depression at the other end. The rod is pivotally mounted intermediate its ends through a spherical bearing to the housing structure. The housing contains a spring loaded assembly containing a ball at one end to engage in the conical depression of the probe rod and a switch mechanism coupled, for example, to an audible signal system at the other end. An adjustment knob is provided to pre-load the spring and set the load conditions under which the switch is actuated. In use, a probe is pressed against the article to apply a transverse force to the probe end such that the rod will pivot in its bearing element thereby forcing the ball out of the conical depression and compressing the spring to close the switch when the predetermined force has been achieved.

Background of the invention

This invention relates to testing tools, and more particularly to tools for applying a force to a workpiece to test whether the same or parts thereof are capable of withstanding specific predetermined forces.

In the manufacture of components such as electronic modules, it is necessary to determine if the soldered or welded joint is sufficiently strong to withstand any forces under normal conditions which tend to separate the joint. As well known, if one such joint is weak, the complete system in which it is located may be disabled.

In modern technology where stress is placed on quality control, it is important that even the most insignificant part of an overall assembly be capable of performing the functions required of it. Thus, means must be provided to test workpieces, such as weld or solder joints, in an effort to determine whether they can withstand predetermined stresses or forces to which they may later be subjected. While much effort has been directed to providing means for testing components or joints of a system, these prior art devices have required skilled personnel to operate same, and thus have enhanced the cost thereof. U.S. Patents 2,849,879 and 3,272,002 are exemplary of these prior art testing devices.

Summary of the invention

This invention overcomes the disadvantages of the prior art testing tools by providing a device which includes a probe unit arranged to apply a pre-set, maximum force to an article for use, for example, in testing welded or soldered joints in a non-destructive manner providing the joint being tested is sufficiently strong to withstand the pre-set force.

Therefore, it is an object of this invention to provide a test apparatus.

A further object of the invention is to provide an apparatus for testing the strength of components of a system.

Another object of the invention is to provide a test apparatus which may be used to determine whether or not soldered or welded connections can withstand a predetermined force applied thereto.

Another object of the invention is to provide a tool which includes a test probe which is deflected such that the operator is made aware when the proper amount of force is being applied to the end of the probe.

Another object of the invention is to provide a testing tool that is capable of being adjusted to apply different desired predetermined forces to different workpieces to be tested.

Another object of the invention is to provide a testing tool which produces a signal, such as an audio signal, upon the application of a predetermined pressure to the end of the test probe.

Other objects of the invention, not specifically set forth above, will become readily apparent from the following description and accompanying drawings wherein:

Brief description of the drawings

FIG. 1 is a perspective view of an embodiment of a testing apparatus made in accordance with the invention;

FIG. 2 is a view partially in cross-section of an embodiment of the inventive test probe unit;

FIG. 3 is a view illustrating the application of the test probe unit to a welded joint;

FIG. 4 is a view partially in cross-section of another embodiment of the inventive test probe unit; and FIG. 5 is a partial view of another embodiment of the inventive test probe unit.

Description of the embodiments

Referring now to the drawings, an embodiment of the testing apparatus is illustrated in FIG. 1 and generally includes a test probe unit 10 and a control circuit box 11, box 11 being mounted on a workbench or the like indicated at 12, while unit 10 is retained via a clip assembly 13 on a support 14 secured to workbench 12. Control circuit box 11 is visually provided with a power cord 15 to plug into a power supply, an earphone 16, an on-off toggle switch 17, and a power indicating light 18. Probe unit 10 is connected to circuit box 11 via a pair of electrical leads or wires 19 and 20.

The embodiment of the test probe unit 10 shown in FIG. 2 includes a hallow housing 21 within which are located a probe rod 22 mounted via a spherical bearing 23, an actuator member or rod 24, a spherical member or ball 25 intermediate rods 22 and 24, and a spring 26. Probe rod 22 extends through an opening 27 in housing 21 and is tapered to provide a probe end 28 and configured at the opposite end, indicated at 29, in the form of a V which cooperates with ball 25 as described hereinafter. Actuator member or rod 24 includes a cutaway or cavity end portion 30 within which ball 25 is partially located, and a reduced diameter portion 31 around which spring 26 is located. Extending around the reduced diameter portion 31 of actuator 24, and threadedly secured as indicated at 32 within the end portion 33 of housing 21, is a spring adjuster or pre-loader knob 34 which abuts against spring 26. Also, extending around reduced portion 31 of actuator 24 and threadedly secured as indicated at 35 within spring adjuster knob 34, is a switch adjuster knob 36. Switch adjuster knob 36 is provided with an aperture 37. Secured, such as by bonding, to the end of the reduced diameter portion 31 of actuator 24, is a non-conductive pad 38 with a conductive plate 39 of the switch secured to the end of the pad 38. Conductive plate 39 is electrically connected with wire or lead 20 via a conductor element 40 which is of the type which allows the plate 39 to turn with respect to the lead 20 whereby the probe unit 10 can be rotated without causing damage to the lead 20. However, a direct connection may be used if desired. A conductor element 41 is secured to housing 21 and to wire or lead 19 to provide electrical continuity therebetween.

In operation, with the probe end 28 positioned against a connector ribbon or member 42 which is welded or otherwise secured to a component lead 43, for example, as shown in FIG. 3, a slow, steadily increasing pressure is applied by the operator in the direction indicated by the legend and arrow 44 which causes the probe rod 22 to pivot in bearing 23, wherein the V configured end 29 thereof moves sidewise and displaces the ball 25 against actuator 24. When sufficient pressure, for example 0.5 to 3 pounds, has been applied against the connector 42, the probe rod 22 will move sufficiently to cause actuator 24 to move to the right, as shown, against spring 26 whereby conductive plate 39 will contact switch adjuster knob 36 and complete the circuit between leads 19 and 20 via housing 21, threads 32, spring adjuster knob 34, threads 35, and switch adjuster knob 36, wherein an audio signal is developed at earphone 16 due to the electronics within control circuit box 11, as known in the art. When the audio signal is heard, release the pressure immediately as continued increase in pressure may be detrimental to the weld joint. The amount of pressure required to overcome the spring 26 can be adjusted by knob 34, while the distance the actuator 24 is required to move so that plate 39 contacts knob 36 is adjusted by the movement of knob 36. Thus, various pressures may be present for different types of applications.

The pressure setting of the probe unit 10 may be accomplished, for example, by placing the probe end 28 against a pressure tester or gauge and applying pressure to housing 21 until an audio signal is heard on the earphone 16 wherein the gauge reading is observed. If a lower or higher pressure reading is desired, the preload of spring 26 and the distance between plate 39 and knob 36 are adjusted. When proper adjustment is made, the audio signal and the desired pressure reading will be simultaneously achieved. In tests conducted on an embodiment of the probe unit, it was found that it repeats within ±2 ounces, and thus provides an effective means for checking a suspected weak weld joint, for example.

The probe unit of the invention is not restricted to use in perpendicular attitude, as illustrated and described above, but may be used in any degree of rotation to its axis as long as it is calibrated and used at the angle for which it was calibrated.

The FIG. 4 embodiment of the probe unit 10 is similar in construction to the FIG. 2 embodiment, and like reference numerals will be utilized where applicable. This embodiment differs from FIG. 1 in that probe end 28' is of a spherical configuration and has a layer of insulative material 45 therebout; a spring 46 is positioned intermediate adjuster knobs 34 and 36 to prevent undesired rotational movement therebetween; switch adjuster knob 36 is coated with insulation material 47 on the exposed surfaces thereof; and a pin 48 extends through a passageway in actuator 24 and into a slot 49 in housing 21 which prevents the actuator from rotating but allows longitudinal movement thereof. The operation of the FIG. 4 embodiment is the same as that described above with respect to FIG. 2.

The FIG. 5 embodiment of the probe unit differs from the FIGS. 2 and 4 embodiment with respect to the manner in which the signal circuit is calibrated and completed, and thus only that portion of the unit 10' is illustrated. Again, similar reference numerals are utilized to indicate similar elements. In the FIG. 5 embodiment, the spring 26 is preloaded by an adjustable member 50 which is threaded into housing portion 33 as indicated at 32, member 50 being provided with holes 51 for a tool such as a spanner wrench for adjusting the load on spring 26. The end of reduced diameter portion 31 of the spring biased actuator 24 is provided with a counterbore or cavity 52 within which a glass or other type insulator rod 53 is bonded or otherwise secured. A coil 54, which may be of either the close wound or spaced wound type, is wound on rod 53 with the leads 55 and 56 thereof being connected to a pressure control unit 57. A support member 58 of non-conductive material, having a central aperture 59 therein, is threadedly secured at 60 to the end 33 of housing 21 such that rod 53 extends into aperture 59. A spring type stylus 61 is secured to support member 58 by a screw or the like, indicated at 62, and is positioned so as to cooperate with coil 54, and is provided with a lead 63 which connects into pressure control unit 57. Control unit 57 is provided, on the outside thereof, with a pound scale 64, a selector knob 65, and an indicator scale generally indicated at 66, with the circuitry being located within. Unit 57 is connected via leads 19 and 20 to the control box 11 for audio signals. Since the operation of control units, such as shown at 57, is known in the art, a detailed description thereof is deemed unnecessary.

The operation of the FIG. 5 embodiment is the same as that described above with respect to FIGS. 2 and 4, except that the probe unit 10' is pressure calibrated by movement of the selector knob 65 of control unit 57; and that movement of actuator 24 causes coil 54 to move with respect to stylus 61, thus transmitting a signal to the earphones 16 (FIG. 1) via unit 57 and leads 19 and 20, while providing a visual indication on scale 66 of unit 57.

It has thus been shown that this invention provides a test apparatus which is: (1) an effective means for checking connections, such as welded or soldered joints; (2) repeats within ±2 ounces; and (3) may be used in any degree of rotation to its axis so long as it is calibrated for the angle used.

Although particular embodiments of the invention have been illustrated and described, modifications will become apparent to those skilled in the art, and it is intended to cover in the appended claims all such modifications as come within the true spirit and scope of the invention.

What I claim is:
1. A pressure indicating probe comprising: a hollow housing, probe rod means pivotally mounted in and extending from one end of said housing, an actuator member positioned within said housing, means for biasing said actuator member toward said probe rod means, means intermediate said probe rod means and said actuator member for transferring motion therebetween, means for adjusting the bias on said actuator member, and switch means having an element thereof secured to and insulated from said actuator member and contact means secured to said housing whereby predetermined movement of said actuator member causes said switch means to provide electrical continuity between said element and said contact means.

2. The pressure indicating probe defined in claim 1, wherein the adjacent ends of said probe rod means and said actuator member are each provided with a depression therein, and wherein said intermediate means is a spherically configured member and is positioned in said depressions, whereby movement of said probe rod means causes said spherical member to move said actuator member against said biasing means.

3. The pressure indicating probe defined in claim 1, wherein said probe rod means includes a taper at the end extending from said housing, and at least a portion of said last mentioned end thereof being provided with insulative material.

4. The pressure indicating probe defined in claim 1, wherein said actuator member includes a reduced diameter portion, wherein said biasing means is a spring-like member, and wherein said bias adjusting means comprises an adjustable knob threadedly secured to said housing and provided with a central aperture through which said reduced diameter portion of said actuator member extends.

5. The pressure indicating probe defined in claim 4, wherein said switch means additionally includes an adjuster knob means threadedly secured to said adjustable knob, said adjuster knob means threadedly secured to said adjustable knob, said adjuster knob means being provided with a cavity therein within which said reduced diameter end portion of said actuator member is adapted to move, and is provided with an aperture through which a lead from said switch element extends, whereby predetermined movement of said actuator member causes said switch element to contact said adjuster knob means wherein electrical continuity is produced via said contact means, said housing, said adjustable knob, said adjuster knob means, and switch element.

6. The pressure indicating probe defined in claim 5, additionally including means intermediate said adjustable knob and said adjuster knob means to prevent rotation of one with respect to the other.

7. The pressure indicating probe defined in claim 1, wherein said housing is provided with a slot therein, and a pin-like means extends therethrough and through said actuator member to prevent rotation of said actuator member while allowing longitudinal movement thereof.

8. The pressure indicating probe defined in claim 1, wherein said switch element comprises a coil, and said switch contact means comprises a spring type stylus.

9. The pressure indicating probe defined in claim 8, wherein said coil and said stylus are electrically connected to a pressure control unit, said pressure control unit including means for adjusting the relationship of the signal produced by movement of said coil with respect to said stylus, said pressure control unit being operably connected to a control assembly which produces an output signal relative to the movement of said coil with respect to said stylus.

10. The pressure indicating probe defined in claim 1, in combination with a control assembly; said control assembly including means for producing an output signal responsive to predetermined movement of said actuator member, and means adapted for controlling an associated power source, said contact means and said element of said switch means being electrically connected via leads with said control assembly.

References Cited

UNITED STATES PATENTS

| | | | |
|---|---|---|---|
| 1,565,577 | 12/1925 | McDonough | 73—161 |
| 2,003,910 | 6/1935 | Stephenson | 73—161 |
| 2,626,523 | 1/1953 | Pike | 73—161 |
| 2,849,879 | 9/1958 | Schiller | 73—141 |
| 2,959,078 | 11/1960 | Skidmore | 81—52.4 |

FOREIGN PATENTS 966,947   8/1964   Great Britain.

RICHARD C. QUEISSER, *Primary Examiner.*

CHARLES A. RUEHL, *Assistant Examiner.*

U.S. Cl. X.R.

73—101, 161; 81—52. 5